(12) United States Patent
Liland

(10) Patent No.: US 11,366,669 B2
(45) Date of Patent: Jun. 21, 2022

(54) APPARATUS FOR PREVENTING RESCHEDULING OF A PAUSED THREAD BASED ON INSTRUCTION CLASSIFICATION

(71) Applicant: SWARM64 AS, Oslo (NO)

(72) Inventor: Eivind Liland, Berlin (DE)

(73) Assignee: Swarm64 AS, Oslo (NO)

( * ) Notice: Subject to any disclaimer, the term of this patent is extended or adjusted under 35 U.S.C. 154(b) by 192 days.

(21) Appl. No.: 15/781,001

(22) PCT Filed: Nov. 30, 2016

(86) PCT No.: PCT/EP2016/079261
§ 371 (c)(1),
(2) Date: Jun. 1, 2018

(87) PCT Pub. No.: WO2017/093307
PCT Pub. Date: Jun. 8, 2017

(65) Prior Publication Data
US 2019/0079775 A1    Mar. 14, 2019

(30) Foreign Application Priority Data
Dec. 2, 2015 (GB) ...................... 1521271

(51) Int. Cl.
G06F 9/38 (2018.01)
G06F 9/30 (2018.01)
(52) U.S. Cl.
CPC .......... G06F 9/3851 (2013.01); G06F 9/3009 (2013.01); G06F 9/3838 (2013.01)
(58) Field of Classification Search
CPC .... G06F 9/3009; G06F 9/3851; G06F 9/4881; G06F 9/30076; G06F 9/30101; G06F 9/3838
See application file for complete search history.

(56) References Cited

U.S. PATENT DOCUMENTS 5,555,432 A * 9/1996 Hinton ................ G06F 9/30145
712/216
5,958,041 A * 9/1999 Petolino, Jr. ........ G06F 9/30043
712/214
(Continued)

FOREIGN PATENT DOCUMENTS

| EP | 0827071 A2 | 3/1998 |
| EP | 1531390 A2 | 5/2005 |
| WO | 200153935 A1 | 7/2001 |

OTHER PUBLICATIONS

Chinese Office Action dated Jan. 26, 2022, issued in connection with Chinese Patent Application No. 201680079091.X, 10 pages.

*Primary Examiner* — David J. Huisman
(74) *Attorney, Agent, or Firm* — McDonnell Boehnen Hulbert & Berghoff LLP

(57) ABSTRACT

Data processing apparatus, data processing methods, a method and a computer program product are disclosed. The data processing apparatus includes a processor core operable to execute sequences of instructions of a plurality of program threads. The processor core has a plurality of pipeline stages, one of which is an instruction schedule stage having scheduling logic operable, in response to a thread pause instruction within a program thread, to prevent scheduling of instructions from that program thread following the thread pause instruction and instead to schedule instructions from another program thread for execution within the plurality of pipeline stages.

6 Claims, 5 Drawing Sheets

(56) References Cited

U.S. PATENT DOCUMENTS

| | | | |
|---|---|---|---|
| 8,214,624 B2 * | 7/2012 | Berglas | G06F 9/30087 712/216 |
| 8,230,423 B2 | 7/2012 | Frigo et al. | |
| 8,607,235 B2 | 12/2013 | Hankins et al. | |
| 2017/0315815 A1 | 11/2017 | Smith et al. | |

* cited by examiner

APPARATUS FOR PREVENTING RESCHEDULING OF A PAUSED THREAD BASED ON INSTRUCTION CLASSIFICATION

FIELD OF THE INVENTION

The present invention relates to data processing apparatus, data processing methods, a method and a computer program product.

BACKGROUND

Traditional microprocessors issue and execute single instructions one after the other. The instructions typically perform a single operation on two scalar values, producing a result. Single-issue variants issue one instruction per clock cycle, which is then processed by one of the execution units. Execution units typically include at least an adder, a multiplier, a load/store unit, and a branch unit. Processors such as these run a single program thread at a time, and belong to the group of single threaded processors, although an operating system may create the illusion of multiple simultaneous threads by configuring the processor to switch between threads at a certain interval. Although these kinds of processors have low performance, they also have a small silicon area, and therefore a reasonable performance per silicon area.

There are processor variants which issue and execute multiple instructions at the same time. These multiple-issue variants look ahead in the instruction stream to find instructions that can be processed in parallel by the different execution units. To increase performance, a processor may also have multiple instances of selected execution units. This results in fast execution of each program thread. However, dependencies between instructions in a thread limit the number of instructions that can be executed in parallel, leaving execution units unused, and the logic required to extract the parallel instructions requires a significant amount of silicon area and power. The routing logic to route values to and from the execution units is also significant. The result is poor efficiency, measured in performance per silicon area and performance per watt.

One type of processor that can achieve a higher performance per silicon area is known as Single Instruction Multiple Data (SIMD Processor). This type of processor operates on fixed width vectors rather than scalar values. Each instruction performs its operation on multiple scalars at a time, using vectorised execution units that are constructed from an array of scalar units arranged in separate lanes. SIMD Processors can be single-issue or multiple-issue. However, the programmer or source language compiler often cannot express the operation to be performed using vectors, in many cases utilizing only one lane of the vectorised execution units.

Another type of processor that can achieve a higher performance per silicon area is known as Very Long Instruction Word Processor (VLIW Processor), where each instruction describes the operation of all the execution units in the processor. In this way, all the execution units can operate every cycle, without the need for multiple-issuing hardware.

The simplest Multiple-issue, SIMD and VLIW processors run a single thread at a time, and may therefore be referred to as single threaded processors.

Although these processors provide useful data processing functionality, they each have their own shortcomings. Accordingly, it is desired to provide improved data processing techniques.

SUMMARY

According to a first aspect, there is provided a data processing apparatus comprising: a processor core operable to execute sequences of instructions of a plurality of program threads, said processor core having a plurality of pipeline stages, one of said pipelined stages being an instruction schedule stage having scheduling logic operable, in response to a thread pause instruction within a program thread, to prevent scheduling of instructions from that program thread following said thread pause instruction and instead to schedule instructions from another program thread for execution within said plurality of pipeline stages.

The first aspect recognizes that some instructions are quicker to execute than others. That is to say that some instructions will have the result of that instruction available for use by a subsequent instruction earlier than other instructions. In particular, some instructions take a first number of cycles to execute, whereas others take greater than this first number of cycles to execute. The difference in the number of cycles taken can be for a variety of reasons, but is particularly problematic for those instructions which have to access data from memory or other storage, or need to be performed by hardware which is not part of the processor core. This difference in the execution time leads to a common performance-limiting factor of pipelined processors which is the amount of time that they have to stop and wait (stall) for instructions to complete. That is to say that if a subsequent instruction will need the result of a preceding instruction before that result is available, then the subsequent instruction will need to be stalled until the result is available.

Various techniques have been developed to try to reduce this performance-limiting factor. As mentioned above, a typical program involves a number of faster-executing as well as slower-executing instructions which need to execute and have the results of those instructions available for use by a subsequent instruction, should it be required. One way of increasing performance is to try to execute the slower-executing instructions in an overlapping fashion as much as possible. However, the extent to which this can be implemented depends on the processor's ability to detect dependencies (or the lack of dependencies) between instructions in order that it may determine which instructions can overlap (since there can be no dependencies between those instructions) and which ones have to run sequentially, one after the other (because there are dependencies between those instructions). Conventional, high-end processors running a single (or in some cases, two) threads sacrifice much silicon area, complexity and power usage on complex schemes which aim to issue overlapping, slow-executing instructions as much as possible. These techniques include speculative execution and out-of-order execution (with instruction dependency analysis and instruction re-ordering). Multi-threaded processors issue overlap instructions from different threads, as there are no dependencies between them. Even though a single thread is waiting for some instruction to complete, the other threads can still execute. However, the silicon area usage grows with the number of threads supported by the processor and this limits the performance that can be achieved in this way. The aforementioned techniques used to achieve overlapped execution of instructions in high-end processors with one or two threads are rarely implemented in deeply multithreaded processors due to the overhead of having to maintain the complex state required for these algorithms for a large number of threads simultaneously.

Accordingly, a data processing apparatus may be provided. The data processing apparatus may comprise a processor core. The processor core may be operable, configurable or adaptable to execute sequences of instructions. Those sequences of instructions may be from a plurality of different program threads. That is to say that the processor core may be operable to execute multiple program threads. Those program threads may be from a single bank of program threads or may be from different banks of program threads which are independently schedulable. The processor core may have a plurality of pipeline stages. One of the pipeline stages may be an instruction schedule stage. The instruction schedule stage may have scheduling logic. The scheduling logic may prevent the scheduling of instructions from a program thread when a thread pause instruction is encountered within the program thread. That is to say that the processor core may be operable to schedule a single program thread at any one time. The scheduling logic may prevent the scheduling of instructions from that program thread and the scheduling logic may instead schedule instructions from a different program for execution within the pipeline stages. In this way, the data processing apparatus itself does not need to determine whether dependencies exist between instructions or not, but instead can simply continue scheduling instructions from a thread until a pause instruction is received. When this occurs, the data processing apparatus can simply switch thread within that bank of program threads and instead begin issuing instructions from another schedulable program thread within that bank of program threads. This significantly simplifies the operation of the processor core.

In one embodiment, said scheduling logic is operable to schedule instructions other than said thread pause instruction from a program thread irrespective of any dependencies between those instructions. Hence, the scheduling logic may be arranged to simply schedule instructions without considering whether any dependencies exist between those instructions. Alternatively, a simple dependency check may be made for, for example, low latency instructions.

In one embodiment, the data processing apparatus comprises a pending completion unit operable to identify executing instructions from program threads which are from a group of instructions classified as being unlikely to be executable in time for their results to be available for use by a subsequent instruction within that program thread and the scheduling logic is operable to prevent rescheduling of a program thread when the pending completion unit indicates that an executing instruction from that program thread which precedes said thread pause instruction is from said group. Accordingly, the pending completion unit may identify instructions from within the program thread which are being executed by the processor core. The pending completion unit may identify one or more instructions which are classified, identified or known to have a certain execution time. This execution time is longer than a time by which a subsequent instruction may require the results of the identified one or more instructions to be available. In other words, the pending completion unit may identify that instructions should have their results available within X cycles in order that the results will be available for a subsequent instruction, but that some instructions identified are taking longer than X cycles to have their results available. The scheduling unit may then prevent the rescheduling of the program thread when it is indicated that an executing instruction from that program thread which precedes the thread pause instruction is still being executed. In other words, a program thread is prevented from being rescheduled when there are outstanding instructions from that program thread which have yet to complete execution. The pending completion unit may maintain an indication of those instructions which are likely to take greater than X cycles to execute, and which are still being executed. While those instructions are still being executed, the pending completion unit prevents the threads from which those executing instructions originated from being rescheduled. In this way, the scheduling logic can easily select a different thread for scheduling on the occurrence of a thread pause instruction and it is ensured that those threads with still executing instructions are not selected for scheduling. This significantly simplifies the operation of the process core.

In one embodiment, the scheduling logic is operable to prevent scheduling of all subsequent instructions within a program thread when the pending completion unit indicates that an executing instruction within that program thread which precedes said thread pause instruction is from said group. Accordingly, each subsequent instruction within the program thread may have their scheduling pause. In other words, those instructions will remain unscheduled.

In one embodiment, the scheduling logic is operable to permit rescheduling of a program thread when the pending completion unit indicates that an executing instruction within that program thread which precedes said thread pause instruction will have its results available in time for use by subsequent instructions. Accordingly, when the pending completion unit indicates that the preceding instruction will now have its results available then scheduling of the instructions within that thread may be resumed.

In one embodiment, the scheduling logic is operable to permit rescheduling of a program thread when the pending completion unit indicates that all executing instructions within that program thread which precedes said thread pause instruction will have their results available in time for use by subsequent instructions. Accordingly, when the pending completion unit indicates that every instruction will have its results available for use by subsequent instructions then scheduling of instructions within that thread may be resumed.

In one embodiment, the scheduling logic is operable to permit rescheduling of a program thread when the pending completion unit indicates that no executing instruction within that program thread which precedes said thread pause instruction will fail to have its results available in time for use by subsequent instructions.

In one embodiment, the scheduling logic is operable to provide an indication to the pending completion unit when an instruction to be executed is from said group. Accordingly, an indication may be provided to the pending completion unit when one of the group of instructions is identified.

In one embodiment, the instruction schedule stage is operable, when an instruction to be executed is from said group, to instruct a handling unit to execute the instruction. Accordingly, when it is determined that the instruction falls within the group which are unlikely to have their results available in time for subsequent instructions, a handling unit may be instructed to execute those instructions.

In one embodiment, the scheduling logic is operable, when an instruction to be executed is from said group of instructions, to instruct the handling unit to execute the instruction by providing an indication of the instruction to be executed and any registers to be updated following execution by the handling unit. Accordingly, the handling unit may be provided both with an indication of the instruction to be executed, together with any registers that need to be updated following execution of the instruction by the handling unit.

In one embodiment, the handling unit is operable, when an executing instruction completes execution, to provide an indication of the executing instruction and the registers to be updated. Accordingly, the handling unit may provide an indication of which instruction has completed and, optionally, the contents and values of the registers to be updated.

In one embodiment, the handling unit is operable, when it is determined that an executing instruction will complete, to indicate to the pending completion unit that the executing instruction will complete execution. Accordingly, when the handling unit determines that execution of the instruction will complete, an indication is provided to the pending completion unit.

In one embodiment, the handling unit is operable, when it is determined that an executing instruction will complete, to indicate to the pending completion unit that the executing instruction will complete execution in advance of the executing instruction completing execution. Accordingly, the indication may be provided to the pending completion unit prior to the instruction actually completing. For example, the handling unit may have information that it will take X cycles before a subsequent instruction could need the results of the instruction being executed by the handling unit and the handling unit may then provide an indication to the pending completion unit when it is known that the instruction being executed by the handling unit will complete and have its results available in X cycles. This enables a subsequent instruction to be scheduled even though the results of the preceding instructions are not yet available, since it is known that those results will be available by the time the subsequent instruction may need them.

In one embodiment, wherein the pending completion unit has a counter identifying when executing instructions from the program thread are from said group and the scheduling logic is operable to change a value of the counter each time executing instructions from the program thread are from said group. Accordingly, a simple count of the number of instructions which are unlikely to be executable in time for the results to be available for use by a subsequent instruction may be maintained. If the counter is cleared then this indicates that there are no pending instructions, whereas if the counter is set then this indicates that there are a number of pending instructions.

In one embodiment, the handling unit is operable to change a value of the counter each time it is determined an executing instruction will complete.

In one embodiment, a value of the counter provides an indication of how many executing instructions from the program thread are from said group.

In one embodiment, the scheduling logic is operable, in response to the thread pause instruction within the program thread, to prevent scheduling of all instructions within that program thread which follow said thread pause instruction and instead to schedule instructions from another program thread for execution when the pending completion unit indicates that any executing instruction within that program thread which precedes said thread pause instruction is from said group. Accordingly, a number of different program threads may be executed by the same processor core. When a pause thread instruction is encountered and the pending completion unit indicates that there is an outstanding instruction then scheduling of the current thread may be paused and a different thread scheduled instead. It will be appreciated that switching between threads enables the execution throughput of the processor core to be maintained even when one particular thread can no longer be scheduled for execution. This helps to maximize the performance of the processor.

In one embodiment, the plurality of program threads comprise a bank of program threads and the scheduling logic is operable to schedule between a plurality of banks of program threads in accordance with a bank scheduling sequence, to prevent scheduling of instructions from that program thread within that bank of threads following the thread pause instruction and instead to schedule instructions from another program thread within the bank of threads for execution within the plurality of pipeline stages. Hence, each bank of threads, which may have their scheduling interleaved, is treated independently of the other.

In one embodiment, the plurality of program threads comprise a bank of program threads and the scheduling logic is operable to schedule between a plurality of banks of program threads in accordance with a bank scheduling sequence and, in response to the thread pause instruction within that program thread, to prevent scheduling of all instructions within that program thread which follow the thread pause instruction and instead to schedule instructions from another program thread within that bank of threads for execution when the pending completion unit indicates that any executing instruction within that program thread which precedes the thread pause instruction is from the group. Hence, each bank of threads, which may have their scheduling interleaved, is treated independently of the other.

In one embodiment, the scheduling logic is operable to schedule instructions from another program thread based on one of a least-recently-scheduled and a round-robin basis. It will be appreciated that a variety of different thread-selection techniques may be utilised.

In one embodiment, the thread pause instruction comprises one of a discrete instruction and an indicator encoded into another instruction. Hence, the thread pause instruction may be a separate instruction. Alternatively, each instruction may be encoded in a way that indicates whether or not a thread pause follows that instruction.

In one embodiment, the group of instructions include at least one of input/output instructions, memory access instructions, floating point instructions and instructions related to shared resources.

According to a second aspect, there is provided a data processing method comprising: executing sequences of instructions of a plurality of program threads using a processor core having a plurality of pipeline stages; in response to a thread pause instruction within a program thread, preventing scheduling of instructions from that program thread following said thread pause instruction and instead scheduling instructions from another program thread for execution within said plurality of pipeline stages.

In one embodiment, the method comprises scheduling every instruction other than said thread pause instruction from a program thread irrespective of any dependencies between those instructions.

In one embodiment, the method comprises identifying executing instructions from program threads which are from a group of instructions classified as being unlikely to be executable in time for their results to be available for use by a subsequent instruction within that program thread and preventing rescheduling of a program thread when it is indicated that an executing instruction from that program thread which precedes said thread pause instruction is from said group.

In one embodiment, the method comprises preventing scheduling of all subsequent instructions within a program thread when it is indicated that an executing instruction within that program thread which precedes said thread pause instruction is from said group.

In one embodiment, the method comprises permitting rescheduling a program thread when it is indicated that an executing instruction within that program thread which precedes said thread pause instruction will have its results available in time for use by subsequent instructions.

In one embodiment, the method comprises permitting rescheduling a program thread when the pending completion unit indicates that all executing instructions within that program thread which precedes said thread pause instruction will have their results available in time for use by subsequent instructions.

In one embodiment, the method comprises permitting rescheduling a program thread when it is indicated that no executing instruction within that program thread which precedes said thread pause instruction will fail to have its results available in time for use by subsequent instructions.

In one embodiment, the method comprises providing an indication when an instruction to be executed is from said group.

In one embodiment, the method comprises, when an instruction to be executed is from said group, instructing a handling unit to execute the instruction.

In one embodiment, the method comprises, when an instruction to be executed is from said group of instructions, instructing a handling unit to execute the instruction by providing an indication of the instruction to be executed and any registers to be updated following execution by the handling unit.

In one embodiment, the method comprises, when an executing instruction completes execution, providing an indication of the executing instruction and the registers to be updated.

In one embodiment, the method comprises, when it is determined that an executing instruction will complete, indicating that the executing instruction will complete execution.

In one embodiment, the method comprises, when it is determined that an executing instruction will complete, indicating that the executing instruction will complete execution in advance of the executing instruction completing execution.

In one embodiment, the method comprises changing a value of the counter each time executing instructions from the program thread are from said group.

In one embodiment, the method comprises changing a value of the counter each time it is determined an executing instruction will complete.

In one embodiment, a value of the counter provides an indication of how many executing instructions from the program thread are from said group.

In one embodiment, the method comprises, in response to the thread pause instruction within the program thread, preventing scheduling of all instructions within that program thread which follow said thread pause instruction and instead scheduling instructions from another program thread for execution when it is indicated that any executing instruction within that program thread which precedes said thread pause instruction is from said group.

In one embodiment, the plurality of program threads comprise a bank of program threads and the method comprises scheduling between a plurality of banks of program threads in accordance with a bank scheduling sequence, preventing scheduling of instructions from that program thread within that bank of threads following the thread pause instruction and instead scheduling instructions from another program thread within the bank of threads for execution within the plurality of pipeline stages.

In one embodiment, the plurality of program threads comprise a bank of program threads and the method comprises scheduling between a plurality of banks of program threads in accordance with a bank scheduling sequence and, in response to the thread pause instruction within that program thread, preventing scheduling of all instructions within that program thread which follow the thread pause instruction and instead scheduling instructions from another program thread within that bank of threads for execution when the pending completion unit indicates that any executing instruction within that program thread which precedes the thread pause instruction is from the group.

In one embodiment, the method comprises scheduling instructions from another program thread based on one of a least-recently-scheduled and a round-robin basis.

In one embodiment, the thread pause instruction comprises one of a discrete instruction and an indicator encoded into another (preceding) instruction.

In one embodiment, the group of instructions include at least one of input/output instructions, memory access instructions, floating point instructions and instructions related to shared resources.

According to a third aspect, there is provided a data processing apparatus comprising: a processor core operable to execute a sequence of instructions of a program thread, the processor core having a plurality of pipeline stages and a pending completion unit operable to identify instructions from the program thread being executed by the processor core which are classified as being unlikely to be executable in time for their results to available for use by a subsequent instruction, one of the pipelined stages being an instruction schedule stage having scheduling logic operable, in response to a thread pause instruction within the program thread, to pause scheduling of a subsequent instruction within the program thread when the pending completion unit indicates that a preceding instruction within the program thread being executed by the processor core is not guaranteed to have its results available in time for use by the subsequent instruction.

The third aspect recognizes that some instructions are quicker to execute than others. That is to say that some instructions will have the result of that instruction available for use by a subsequent instruction earlier than other instructions. In particular, some instructions take a first number of cycles to execute, whereas others take greater than this first number of cycles to execute. The difference in the number of cycles taken can be for a variety of reasons, but is particularly problematic for those instructions which have to access data from memory or other storage, or need to be performed by hardware which is not part of the processor core. This difference in the execution time leads to a common performance-limiting factor of pipelined processors which is the amount of time that they have to stop and wait (stall) for instructions to complete. That is to say that if a subsequent instruction will need the result of a preceding instruction before that result is available, then the subsequent instruction will need to be stalled until the result is available.

Various techniques have been developed to try to reduce this performance-limiting factor. As mentioned above, a typical program involves a number of faster-executing as well as slower-executing instructions which need to execute and have the results of those instructions available for use by a subsequent instruction, should it be required. One way of increasing performance is to try to execute the slower-executing instructions in an overlapping fashion as much as possible. However, the extent to which this can be implemented depends on the processor's ability to detect dependencies (or the lack of dependencies) between instructions in order that it may determine which instructions can overlap (since there can be no dependencies between those instructions) and which ones have to run sequentially, one after the other (because there are dependencies between those instructions). Conventional, high-end processors running a single (or in some cases, two) threads sacrifice much silicon area, complexity and power usage on complex schemes which aim to issue overlapping, slow-executing instructions as much as possible. These techniques include speculative execution and out-of-order execution (with instruction dependency analysis and instruction re-ordering). Multi-threaded processors issue overlap instructions from different threads, as there are no dependencies between them. Even though a single thread is waiting for some instruction to complete, the other threads can still execute. However, the silicon area usage grows with the number of threads supported by the processor and this limits the performance that can be achieved in this way. Also, these methods are rarely implemented in multi-threaded processors due to the overhead of having to maintain the complex state required for these algorithms for a large number of threads simultaneously.

Accordingly, a data processing apparatus may be provided. The data processing apparatus may comprise a processor core. The processor core may execute a sequence of instructions of a program thread. The processor core may have more than one pipeline stage. The processor core may have a pending completion unit. The pending completion unit may identify instructions from within the program thread which are being executed by the processor core. The pending completion unit may identify those instructions which are classified, identified or known to have an execution time which is longer than the time by which a subsequent instruction may require the results of that instruction to be available. In other words, the pending completion unit may identify that instructions should have their results available within X cycles in order that the results will be available for a subsequent instruction, but that some instructions are identified as taking longer than X cycles to have their results available. One of the pipeline stages may be an instruction schedule stage. The instruction schedule stage may have scheduling logic which schedules a subsequent instruction within the program thread. The scheduling logic may pause scheduling of the subsequent instruction when a pause instruction is encountered within the program thread and when the pending completion unit indicates that a preceding instruction within the program thread will not, is unlikely to or is not guaranteed to have its results available in time for use by the subsequent instruction. In other words, the pending completion unit may maintain an indication of those instructions which will or are likely to take greater than a defined number of cycles (such as X cycles) to execute, and which are still being executed. Should a thread pause instruction be encountered while the pending completion unit indicates that a preceding instruction which is likely to take greater than X cycles to execute is still being executed, then scheduling of a subsequent instruction may be paused. In this way, the data processing apparatus does not need to determine whether dependencies exist between instructions or not, but instead can simply continue issuing instructions until both a pause instruction is received and an earlier instruction which is unlikely to execute in time for a subsequent instruction remains outstanding. This significantly simplifies the operation of the processor core.

In one embodiment, the scheduling logic is operable, in response to the thread pause instruction within the program thread, to pause scheduling of all subsequent instructions within the program thread when the pending completion unit indicates that a preceding instruction within the program thread being executed by the processor core is not guaranteed to have its results available in time for use by the subsequent instructions. Accordingly, each subsequent instruction within the program thread may have their scheduling pause. In other words, those instructions will remain unscheduled.

In one embodiment, the scheduling logic is operable to resume scheduling of the subsequent instruction within the program thread when the pending completion unit indicates that the preceding instruction within the program thread being executed by the processor core will have its results available in time for use by the subsequent instruction. Accordingly, when the pending completion unit indicates that the preceding instruction will now have its results available then scheduling of the instructions within that thread may be resumed.

In one embodiment, the scheduling logic is operable to resume scheduling of the subsequent instruction within the program thread when the pending completion unit indicates that all preceding instructions within the program thread being executed by the processor core will have their results available in time for use by the subsequent instruction. Accordingly, when the pending completion unit indicates that every instruction will have its results available for use by subsequent instructions then scheduling of instructions within that thread may be resumed.

In one embodiment, the scheduling logic is operable to resume scheduling of the subsequent instruction within the program thread when the pending completion unit indicates that no preceding instruction within the program thread being executed by the processor core will fail to have its results available in time for use by the subsequent instruction.

In one embodiment, the instruction schedule stage is operable, when an instruction to be executed is one of a group of instructions which are classified as being unlikely to be executable in time for their results to available for use by a subsequent instruction, to instruct a handling unit to execute the instruction. Accordingly, when it is determined that the instruction falls within the group which are unlikely to have their results available in time for subsequent instructions, a handling unit may be instructed to execute those instructions.

In one embodiment, the instruction schedule stage is operable, when an instruction to be executed is one of the group of instructions, to instruct the handling unit to execute the instruction by providing an indication of the instruction to be executed and any registers to be updated following execution by the handling unit. Accordingly, the handling unit may be provided both with an indication of the instruction to be executed, together with any registers that need to be updated following execution of the instruction by the handling unit.

In one embodiment, one of the plurality of stages is operable to provide an indication to the pending completion unit when an instruction to be executed is one of the group of instructions. Accordingly, an indication may be provided to the pending completion unit when one of the group of instructions is identified.

In one embodiment, the handling unit is operable, when it is determined that execution of the instruction will complete, to indicate to the pending completion unit that the instruction will complete execution. Accordingly, when the handling unit determines that execution of the instruction will complete, an indication is provided to the pending completion unit.

In one embodiment, the handling unit is operable, when it is determined that execution of the instruction will complete, to indicate to the pending completion unit that the instruction will complete execution in advance of the instruction completing execution. Accordingly, the indication may be provided to the pending completion unit prior to the instruction actually completing. For example, the handling unit may have information that it will take X cycles before a subsequent instruction could need the results of the instruction being executed by the handling unit and the handling unit may then provide an indication to the pending completion unit when it is known that the instruction being executed by the handling unit will complete and have its results available in X cycles. This enables a subsequent instruction to be scheduled even though the results of the preceding instructions are not yet available, since it is known that those results will be available by the time the subsequent instruction may need them.

In one embodiment, the handling unit is operable, when the instruction completes execution, to provide an indication of the instruction executed and the registers to be updated. Accordingly, the handling unit may provide an indication of which instruction has completed and, optionally, the contents and values of the registers to be updated.

In one embodiment, the pending completion unit has a counter identifying when instructions from the program thread being executed by the processor core are classified as being unlikely to be executable in time for their results to available for use by a subsequent instruction and the one of the plurality of stages is operable to change a value of the counter each time instructions from the program thread being executed by the processor core are classified as being unlikely to be executable in time for their results to available for use by a subsequent instruction. Accordingly, a simple count of the number of instructions which are unlikely to be executable in time for the results to be available for use by a subsequent instruction may be maintained. If the counter is cleared then this indicates that there are no pending instructions, whereas if the counter is set then this indicates that there are a number of pending instructions.

In one embodiment, the handling unit is operable to change a value of the counter each time it is determined that execution of the instruction will complete.

In one embodiment, a value of the counter provides an indication of how many instructions from the program thread being executed by the processor core are classified as being unlikely to be executable in time for their results to available for use by a subsequent instruction.

In one embodiment, the group of instructions include at least one of input/output instructions, memory access instructions, floating point instructions and instructions related to shared resources.

In one embodiment, the processor core is operable to execute a sequence of instructions of a plurality of program threads and the scheduling logic is operable, in response to the thread pause instruction within the program thread, to pause scheduling of all subsequent instructions within that program thread when the pending completion unit indicates that a preceding instruction within the program thread being executed by the processor core is not guaranteed to have its results available in time for use by the subsequent instructions and instead to schedule instructions from another program thread. Accordingly, a number of different program threads may be executed by the same processor core. When a pause thread instruction is encountered and the pending completion unit indicates that there is an outstanding instruction then scheduling of the current thread may be paused and a different thread scheduled instead. It will be appreciated that switching between threads enables the execution throughput of the processor core to be maintained even when one particular thread can no longer be scheduled for execution. This helps to maximize the performance of the processor.

In one embodiment, the scheduling logic is operable, in response to the thread pause instruction within the program thread, to pause scheduling of all subsequent instructions within that program thread when the pending completion unit indicates that any preceding instruction within the program thread being executed by the processor core will fail to have its results available in time for use by the subsequent instructions and instead to schedule instructions from another program thread.

In one embodiment, the scheduling logic is operable to schedule instructions from another program thread based on one of a least-recently-scheduled and round-robin basis. It will be appreciated that a variety of different thread-selection techniques may be utilised.

In one embodiment, the thread pause instruction comprises one of a discrete instruction and an indicator encoded into another instruction. Hence, the thread pause instruction may be a separate instruction. Alternatively, each instruction may be encoded in a way that indicates whether or not a thread pause should follow that instruction.

According to a fourth aspect, there is provided a data processing apparatus comprising the data processing apparatus of the first and third aspects. Accordingly, there is provided a data processing apparatus comprising: a processor core operable to execute sequences of instructions of a plurality of program threads, said processor core having a plurality of pipeline stages, one of said pipelined stages being an instruction schedule stage having scheduling logic operable, in response to a thread pause instruction within a program thread, to prevent scheduling of instructions from that program thread following said thread pause instruction and instead to schedule instructions from another program thread for execution within said plurality of pipeline stages; and a pending completion unit operable to identify instructions from the program thread being executed by the processor core which are classified as being unlikely to be executable in time for their results to available for use by a subsequent instruction, one of the pipelined stages being an instruction schedule stage having scheduling logic operable, in response to a thread pause instruction within the program thread, to pause scheduling of a subsequent instruction within the program thread when the pending completion unit indicates that a preceding instruction within the program thread being executed by the processor core is not guaranteed to have its results available in time for use by the subsequent instruction.

In embodiments, any embodiment of the first aspect mentioned above may be combined any embodiment of the third aspect mentioned above.

According to a fifth aspect, there is provided a data processing method comprising: executing a sequence of instructions of a program thread using a processor core processor core having a plurality of pipeline stages; identifying instructions from the program thread being executed by the processor core which are classified as being unlikely to be executable in time for their results to available for use by a subsequent instruction; in response to a thread pause instruction within the program thread, pausing scheduling of a subsequent instruction within the program thread when it is indicated that a preceding instruction within the program thread being executed by the processor core is not guaranteed to have its results available in time for use by the subsequent instruction.

In one embodiment, the method comprises, in response to the thread pause instruction within the program thread, pausing scheduling of all subsequent instructions within the program thread when it is indicated that a preceding instruction within the program thread being executed by the processor core is not guaranteed to have its results available in time for use by the subsequent instructions.

In one embodiment, the method comprises resuming scheduling of the subsequent instruction within the program thread when it is indicated that the preceding instruction within the program thread being executed by the processor core will have its results available in time for use by the subsequent instruction.

In one embodiment, the method comprises resuming scheduling of the subsequent instruction within the program thread it is indicated that all preceding instructions within the program thread being executed by the processor core will have their results available in time for use by the subsequent instruction.

In one embodiment, the method comprises resuming scheduling of the subsequent instruction within the program thread when it is indicated that no preceding instruction within the program thread being executed by the processor core will fail to have its results available in time for use by the subsequent instruction.

In one embodiment, the method comprises, when an instruction to be executed is one of a group of instructions which are classified as being unlikely to be executable in time for their results to available for use by a subsequent instruction, instructing a handling unit to execute the instruction.

In one embodiment, the method comprises, when an instruction to be executed is one of the group of instructions, instructing the handling unit to execute the instruction by providing an indication of the instruction to be executed and any registers to be updated following execution by the handling unit.

In one embodiment, the method comprises providing an indication when an instruction to be executed is one of the group of instructions.

In one embodiment, the method comprises, when it is determined that execution of the instruction will complete, indicating the instruction will complete execution.

In one embodiment, the method comprises, when it is determined that execution of the instruction will complete, indicating that the instruction will complete execution in advance of the instruction completing execution.

In one embodiment, the method comprises, when the instruction completes execution, providing an indication of the instruction executed and the registers to be updated.

In one embodiment, the method comprises identifying using a counter when instructions from the program thread being executed by the processor core are classified as being unlikely to be executable in time for their results to available for use by a subsequent instruction and changing a value of the counter each time instructions from the program thread being executed by the processor core are classified as being unlikely to be executable in time for their results to available for use by a subsequent instruction.

In one embodiment, the method comprises changing a value of the counter each time it is determined that execution of the instruction will complete.

In one embodiment, a value of the counter provides an indication of how many instructions from the program thread being executed by the processor core are classified as being unlikely to be executable in time for their results to available for use by a subsequent instruction.

In one embodiment, the group of instructions include at least one of input/output instructions, memory access instructions, floating point instructions and instructions related to shared resources.

In one embodiment, the method comprises executing a sequence of instructions of a plurality of program threads and, in response to the thread pause instruction within the program thread, pausing scheduling of all subsequent instructions within that program thread when it is indicated that a preceding instruction within the program thread being executed by the processor core is not guaranteed to have its results available in time for use by the subsequent instructions and instead scheduling instructions from another program thread.

In one embodiment, the method comprises, in response to the thread pause instruction within the program thread, pausing scheduling of all subsequent instructions within that program thread when it is indicated that any preceding instruction within the program thread being executed by the processor core will fail to have its results available in time for use by the subsequent instructions and instead scheduling instructions from another program thread.

In one embodiment, the method comprises scheduling instructions from another program thread based on one of a least-recently-scheduled and round-robin basis. That is to say that the scheduling is from the different threads and not among instructions from the threads. Instructions are issued from one thread and, when no more can be issued, a switch in thread occurs.

In one embodiment, the thread pause instruction comprises one of a discrete instruction and an indicator encoded into another instruction.

According to a sixth aspect, there is provided a data processing apparatus comprising the data processing apparatus of the second and fifth aspects. Accordingly, there is provided a data processing method comprising: executing a sequence of instructions of a program thread using a processor core processor core having a plurality of pipeline stages; identifying instructions from the program thread being executed by the processor core which are classified as being unlikely to be executable in time for their results to available for use by a subsequent instruction; in response to a thread pause instruction within the program thread, pausing scheduling of a subsequent instruction within the program thread when it is indicated that a preceding instruction within the program thread being executed by the processor core is not guaranteed to have its results available in time for use by the subsequent instruction; and identifying instructions from the program thread being executed by the processor core which are classified as being unlikely to be executable in time for their results to available for use by a subsequent instruction; in response to a thread pause instruction within the program thread, pausing scheduling of a subsequent instruction within the program thread when it is indicated that a preceding instruction within the program thread being executed by the processor core is not guaranteed to have its results available in time for use by the subsequent instruction.

In embodiments, any embodiment of the second aspect mentioned above may be combined any embodiment of the fifth aspect mentioned above.

According to a seventh aspect, there is provided a method of compiling a sequence of instructions for execution by a processor core having a plurality of pipeline stages, comprising: grouping the instructions into snippets, each snippet comprising at least one instruction classified as being unlikely to be executable in time for its results to available for use by a subsequent instruction within the snippet and; terminating each snippet with a thread pause instruction.

In one embodiment, at least one snippet comprises a plurality of instructions classified as being unlikely to be executable in time for its results to available for use by a subsequent instruction within the snippet.

In one embodiment, each snippet comprises only instructions which fail to have any dependencies on the plurality of instructions classified as being unlikely to be executable in time for its results to available for use by a subsequent instruction within the snippet.

In one embodiment, each of the plurality of instructions classified as being unlikely to be executable in time for its results to available for use by a subsequent instruction within the snippet fail to have any dependencies between them.

In one embodiment, at least one snippet comprises at least one instruction executable in time for its results to available for use by a subsequent instruction within the snippet.

In one embodiment, each snippet comprises instructions which have dependencies on other earlier instructions within the snippet which are executable in time for their results to available for use by those instructions.

In one embodiment, at least one snippet comprises a plurality of instructions executable in time for its results to available for use by a subsequent instruction within the snippet.

In one embodiment, each of the plurality of instructions executable in time for its results to available for use by a subsequent instruction within the snippet have dependencies between them.

In one embodiment, the grouping comprises: ordering the instructions from a start node using a directed graph, based on dependencies between the instructions; for each instruction within the directed graph, determining a number of instructions classified as being unlikely to be executable in time for its results to available for use by a subsequent instruction between that instruction and the start node; allocating each instruction having a same number of instructions classified as being unlikely to be executable in time for its results to available for use by a subsequent instruction between that instruction to a bucket for that number; ordering instructions within each bucket to create each snippet where instructions which are dependent on an earlier instruction are ordered to appear after the earlier instruction in the list and terminating each snippet with the thread pause instruction; concatenating each snippet together to form a compiled sequence of instructions starting with that snippet associated with the bucket having a least number of number of instructions classified as being unlikely to be executable in time for its results to available for use by a subsequent instruction.

According to an eighth aspect, there is provided a computer program product operable, when executed on a computer, to perform the method steps of the second, fifth, sixth or seventh aspects.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
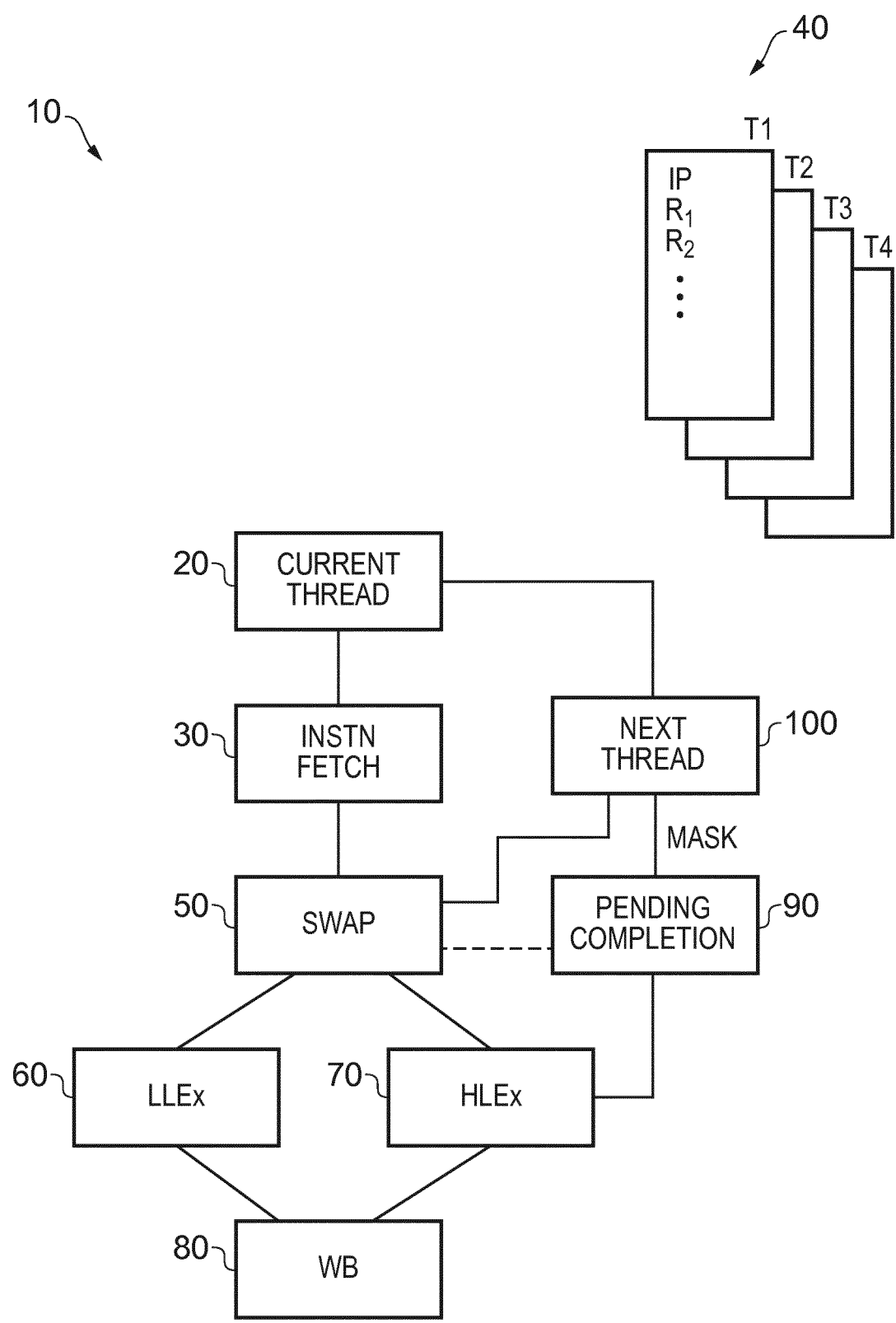
FIG. 1 is a schematic illustration of a processor core according to embodiments.

Before discussing the embodiments in more detail, first an overview will be provided. Embodiments provide an efficient arrangement for the processing of program code by a processor core. The instructions supported by the processor are divided into one of two types, categories or classes. The first class of instructions is faster-executing or low-latency instructions. These low-latency instructions are instructions which can be processed and the result of that processing is available immediately for any subsequent instruction (in other words, the result can guaranteed to be available for use as an input for the following instructions). The second class of instructions is slower-executing or high-latency instructions. These high-latency instructions are instructions whose results may not be available to be taken as an input for the following instruction since these instructions take longer to execute (in other words, the result cannot be guaranteed to be available for use as an input for the following instructions). In addition to these two types of instructions, a pause (or thread pause) command is encoded into the instruction stream, typically when the instruction stream is compiled. In embodiments, the instructions are from a regular, orthogonal RISC-type instruction set which typically utilise a pair of source registers and a single destination register.

Instructions are arranged into a plurality different threads as is well-known in the art. The instructions may be arranged as a single bank of threads, or as multiple banks of threads. Where multiple banks of threads are used, then these may be scheduled in accordance with a scheduling scheme. For example, when using 2 banks of 8 threads, the 2 banks of threads alternated between. In embodiments, the processor core is configured, within each bank of threads, to schedule only one of the threads within that bank of threads at any one time. That is to say that the concurrent scheduling of multiple threads is not supported. Once a thread has been selected for scheduling, instructions are scheduled solely from that that thread until a pause command is encountered. In one embodiment, when the pause command is encountered then another thread within that bank of threads is scheduled and scheduling of the current thread within that bank of threads is suspended. A thread may not be rescheduled if there are any high-latency instructions outstanding (yet to complete) for that thread. In one embodiment, when the pause command is encountered the thread may continue to be scheduled if there are no high-latency instructions for that thread outstanding (yet to complete). It will be appreciated that each bank of threads is scheduled independently of the others.

The compiler generating the program is responsible for analysing dependencies between the instructions, reordering them and introducing pause commands so that dependencies between instructions are enforced, while the length between each pause command is maximized. This allows the issuing of large numbers of high-latency instructions to run simultaneously, both inter-thread and intra-thread. The mechanism to check whether a thread can be scheduled is simple. In one embodiment, a thread is scheduled until a pause command is encountered and then another thread is scheduled and scheduling of the current thread is suspended. A thread may not be rescheduled if there are any high-latency instructions outstanding (yet to complete) for that thread. In one embodiment, it is only required to check whether there are any outstanding high latency instructions for that thread when a pause command is encountered and otherwise the thread continues to be scheduled, which saves both power and silicon area.

Processor Core Architecture

FIG. 1 is a schematic illustration of a single multi-threaded processor core, generally 10, according to embodiments. Only the main components of the processor core 10 are shown, with other components omitted to improve clarity.

Current Thread Unit

A current thread unit 20 is provided which maintains an indication of the current thread being scheduled within each bank of threads. Coupled with the current thread unit 20 is an instruction fetch stage 30 which fetches the next instruction for the currently-scheduled thread within that bank of threads. The next instruction to be scheduled is determined by referring to an instruction pointer for the currently-scheduled thread within a set of registers 40. The set of registers 40 maintain a complete set of registers for each thread. In this example, there are four sets of registers, one for each of threads T1 to T4 within a bank of threads. It will be appreciated that this would be duplicated if further banks of threads were provided. Coupled with the instruction fetch stage 30 is a swap thread unit 50. The swap thread unit 50 determines whether the currently-scheduled thread can continue to be scheduled or whether a different thread needs to be scheduled within that bank of threads, as will be explained in more detail below.

Execution Units Coupled with the swap thread unit 50 are a low-latency execution unit 60 and a high-latency execution unit 70. Instructions classified as low-latency instructions are provided to the low-latency execution unit 60 for execution. Instructions classified as high-latency execution instructions are provided to the high latency execution unit 70. It will be appreciated that the classification could be implemented in a variety of different ways. In this example, a particular range of instruction identifiers are reserved for low-latency instructions and another range of instruction identifiers are reserved for high-latency instructions.

Instructions provided to the low-latency execution unit 60 are fully pipelined so that it is capable of accepting a different instruction each clock cycle and the results of a previous instruction will be available to the subsequent instruction when that subsequent instruction reaches the appropriate stage within the low-latency execution unit 60. Hence, low-latency instructions issued to the low-latency execution unit 60 can be certain to have their results available for any subsequent instruction also issued to the low-latency execution unit 60 without any stalls, waits or bubbles needing to be introduced. This is because the results are known to be available by no longer than the minimum number of cycles by which the next instruction within the thread may need the results of that instruction. In contrast, instructions issued to the high-latency execution unit 70 are those whose results are either known to take longer than the minimum number of cycles by which the next instruction within the thread may need the results of that instruction or those where it cannot be certain that the results will take no longer than the minimum number of cycles by which the next instruction within the thread may need the results of that instruction. For example, if the low-latency execution unit 60 could need the results of a previous instruction within three cycles of a subsequent instruction being issued to it for execution, then the high latency execution unit 70 will handle any instructions which either are known to or which may require more than three cycles to have their results available for subsequent instruction.

Write Back Unit

Coupled with the low-latency execution unit 60 and the high-latency execution unit 70 is a write-back unit 80 which performs the appropriate register write-back to following execution of instructions by the low-latency execution unit 60 or the high-latency execution unit 70. In particular, write-back occurs to the appropriate registers associated with the thread from which the instruction originated.

Pending Completion Unit

Coupled with the high-latency execution unit 70 is a pending completion unit 90. The pending completion unit 90 maintains a record of all instructions provided to the high-latency execution unit 70 which have yet to be fully executed. In particular, an indication is maintained for each thread. For example, at a particular point in time, thread T1 may have two instructions currently being executed by the high-latency execution unit 70 and thread T3 may have one instruction currently being executed by the high-latency execution unit 70, whereas neither thread T2 nor thread T4 have any instructions being executed by the high latency execution unit 70. Typically, a counter is maintained for each thread and that counter is incremented as instructions are provided to the high-latency execution unit 70 for execution. The appropriate counter is decreased as the instructions complete their execution within the high-latency execution unit 70 and the results are written-back by the write-back unit 80. In one optimization, the appropriate counter within the pending completion unit 90 is decreased a particular number of cycles (for example, 3 cycles for the example given above) prior to the results being available so that a subsequent instruction may be issued to the low-latency execution unit 60 earlier than would otherwise be possible. The results of the instruction being executed by the high-latency execution unit 70 will become available just as it is required by the subsequent instruction being executed by the low-latency execution unit 60. A schedulable threads mask is generated from the counters for threads T1 to T4 within the pending completion unit 90 which indicates whether a thread can be scheduled or not. It will be appreciated that this would be duplicated if further banks of threads were provided.

Swap Thread Unit

As will be explained in more detail below, the swap thread unit 50 takes action whenever a pause command is encountered and two different approaches are possible.

In one embodiment, whenever a pause command is encountered, the swap thread unit 50 indicates that a different thread within that bank of threads should be scheduled and a different schedulable thread is then selected by the next thread unit 100 for scheduling. For example, should thread T1 currently be being executed when a pause command is encountered, then the swap thread unit 50 will communicate with the next thread unit 100 in order to select a new thread (one of T2 to T4) to be scheduled. The next thread unit 100 selects a different thread to be scheduled from those threads within that bank of threads that can be scheduled (because they have no outstanding high-latency instructions) as will be explained in more detail below.

In one embodiment, whenever a pause command is encountered, the swap thread unit 50 interrogates the pending completion unit 90 to determine whether the pause command can be ignored (and the current thread is continued to be scheduled) or whether a different schedulable thread within that bank of threads needs to be selected by the next thread unit 100 for scheduling. For example, should thread T1 currently be being executed when a pause command is encountered, then the swap thread unit 50 will interrogate the pending completion unit 90 and determine whether the counter is set or not for thread T1. If the counter is set for thread T1, then the swap unit 50 communicates with the next thread unit 100 in order to select a new thread (one of T2 to T4) to be scheduled. The next thread unit 100 selects a different thread to be scheduled from those threads that can be scheduled (because they have no outstanding high-latency instructions) as will be explained in more detail below. If the counter is not set for thread T1, then the pause command is ignored and thread T1 continues to be scheduled.

When requested, the next thread unit 100 determines the next thread to be scheduled within that bank of threads. Typically, the threads are selected on a round-robin or on a least recently scheduled basis. When an indication is provided from the swap thread unit 50 that the next thread needs to be selected, an indication is provided to the next thread unit 100. The next thread unit 100 selects a different thread for scheduling using an appropriate selection mechanism. For example, in one embodiment the next thread unit 100 selects the next thread on a round-robin basis. In another embodiment the next thread unit 100 selects a different thread on a least recently scheduled basis. Irrespective of which mechanism is used, the mask is interrogated to see whether the selected thread can be scheduled and, if not, then another thread is selected until a thread is selected which can be scheduled.

The selected thread is indicated to the current thread unit 20 and the next instruction indicated by the instruction pointer for that thread is fetched by the instruction fetch unit 30.

Example Core Operation

Figure 2:
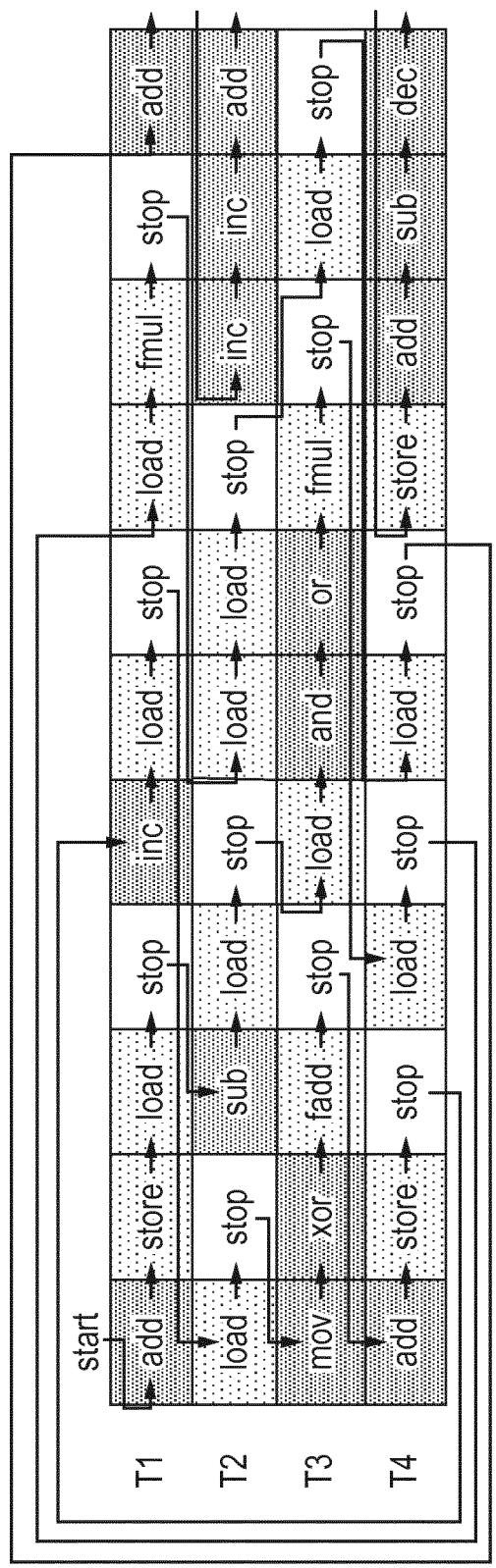
FIG. 2 shows four threads executing program code in the core.

FIG. 2 shows four threads executing program code in the core 10. In this example, there is just 1 bank of 4 threads to aid understanding. However, if more banks of threads where provided, then each of these would be scheduled in accordance with a bank scheduling scheme (for example, scheduling between the banks on a round-robin basis) and the different banks of threads are treated independently of each other. The arrows show the order in which instructions are issued by the instruction fetch unit 30. Each row represents one of the four threads T1 to T4 and its associated program. The program reads from left to right.

Thread T1 starts with the instruction "add". This instruction is fetched by the instruction fetch unit 30 and is issued to the low-latency execution unit 60.

In the next cycle (because there is just one bank of threads), the instruction fetch unit 30 fetches a "store" instruction which is issued to the high-latency execution unit 70 because it is classified as a high-latency instruction (but if there was another bank of threads, then the instruction fetch unit 30 would fetch the next instruction from within that other bank of threads The high-latency execution unit 70 provides an indication to the pending completion unit 90 that a high-latency instruction is pending. The counter associated with thread T1 is incremented by the pending completion unit 90.

In the next cycle, the instruction fetch unit 30 fetches a "load" instruction. This instruction is also issued to the high-latency execution unit 70. The high-latency execution unit 70 indicates to the pending completion unit 90 that there is a pending instruction for thread T1. The pending completion unit 90 then increments the counter associated with thread T1.

In the next cycle, the instruction fetch unit 30 fetches a "pause" instruction. In one embodiment, the swap thread unit 50 interrogates the pending completion unit 90 to see whether there are any outstanding high latency instructions and, in this example, the pending completion unit 90 indicates that there are. If the pending completion unit 90 had indicated that there were no pending high latency instructions for thread T1, then the pause instruction would be ignored. In another embodiment, when the "pause" instruction is encountered then the swap unit 50 would simply instruct the next thread unit 100 to determine the next thread to be selected without interrogating the pending completion unit 90 first. In this example, the next thread unit 100 selects threads on a round-robin basis. The mask provided by the pending completion unit 90 is set for thread T1 but is unset for threads T2, T3 and T4. Accordingly, the next thread unit 100 selects the thread T2 and provides that indication to the current thread unit 20.

In the next cycle, the instruction fetch unit 30 then fetches the first instruction for thread T2 indicated by the instruction pointer of the register bank 40 associated with thread T2. The "load" instruction is issued to the high-latency execution unit 70. The high-latency execution unit 70 indicates to the pending completion unit 90 that a high-latency instruction is being executed and the pending completion unit 90 increments the counter associated with thread T2.

In the next cycle, the instruction fetch unit 30 fetches a "pause" instruction. The swap thread unit functions as mentioned above and since there is a pending instruction for thread T2, the next thread unit selects thread T3 for scheduling and provides that indication to the current thread unit 20.

This process continues as illustrated in FIG. 2 until a "pause" instruction is encountered in thread T4.

In this example, both the "store" and the "load" instructions of thread T1 have by this time either fully executed and their results been written back or will have their results available by the time a fetched instruction requires them, and so the high-latency execution unit 70 will have decreased the counter for thread T1 in the pending completion unit 90, which is now cleared. Accordingly, the next thread unit 100 can reschedule thread T1 and in the next cycle the instruction fetch unit 30 fetches the "INC" instruction, which is issued to the low-latency execution unit 60.

Hence, it can be seen that there is an increased likelihood that an instruction can be scheduled every cycle, with no requirement for any pauses or stalling of the pipeline. The likelihood of needing to wait can be decreased by increasing the number of threads from four to, for example, 16 or more. Also, no complex analysis of dependencies needs to be undertaken, other than interrogating the pending completion unit to see whether an instruction is outstanding or not, which reduces the schedule-processing requirements on the processor core.

Compiling

Figure 3:
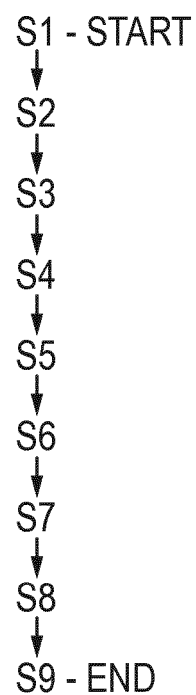
FIG. 3 describes the main steps performed by a compiler when compiling code and inserting appropriate pause commands.

FIG. 3 describes the main steps performed by a compiler when compiling code and inserting appropriate pause commands. In overview, each thread is compiled separately. Each thread is formed from one or more snippets (sequence of instructions). Each snippet is formed to comprise only instructions which fail to have any dependencies on high-latency instructions. In other words, instructions in a snippet may not depend on the result of high-latency instructions in the same snippet. Each snippet is also formed to comprise instructions which have dependencies on other earlier instructions within the snippet which are executable in time for their results to available for use by those instructions. In other words, instructions in a snippet may depend on the result of low-latency instructions in the same snippet.

Figure 4A:
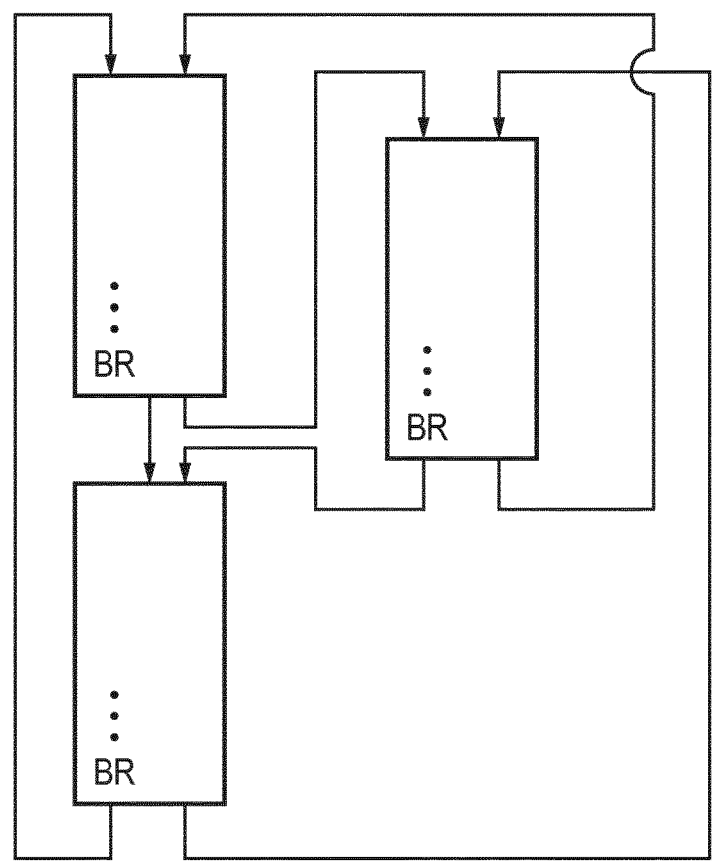
FIGS. 4A to 4C illustrate such compiling on an example piece of code.
Figure 4B:
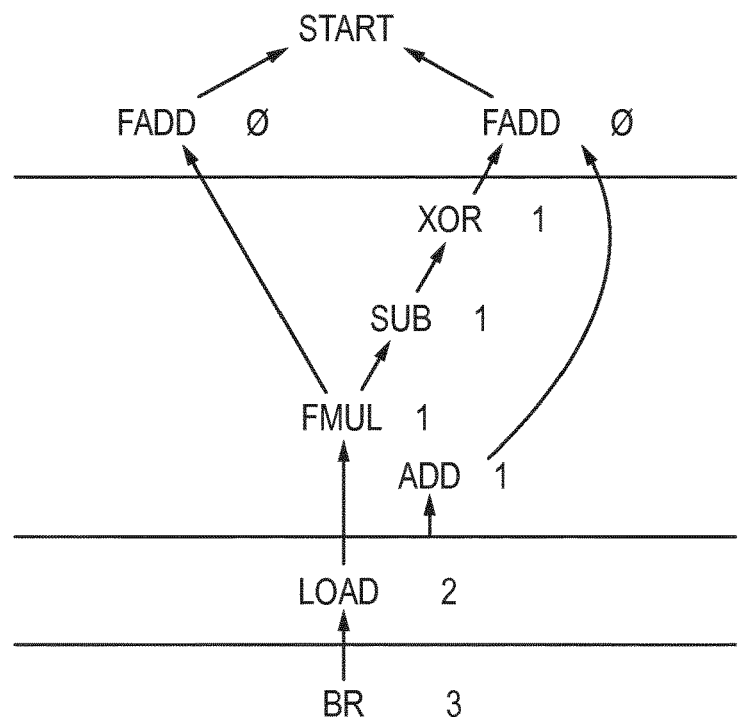
Figure 4C:
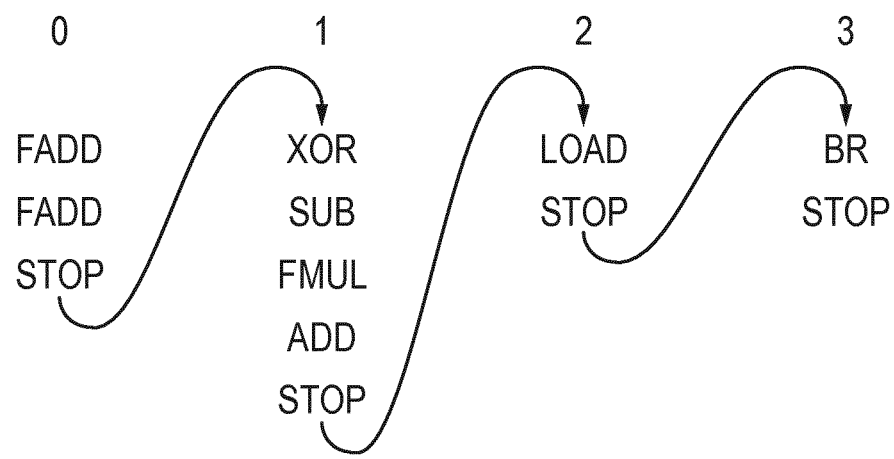

FIGS. 4A to 4C illustrate such compiling on an example piece of code, such as a thread. At step S1, the code is split into basic blocks, as illustrated in FIG. 4A, with each basic block terminating with a branch instruction.

At step S2, the data dependencies within a basic block are analysed, as are other ordering dependencies between instructions in the basic block At step S3, a directed graph is generated, as shown in FIG. 4B, with the nodes representing the instructions and edges representing dependencies. A start node is provided which is connected to all nodes having no dependencies.

At step S3, for each node, a determination is made of the maximum number of high-latency instruction nodes encountered along the possible paths to that node from the start node. These are indicated by the numbers shown next to the instructions shown in FIG. 4B.

At step S5, all the instructions are assigned to a set of buckets according to the number mentioned above. For example, the branch instruction is assigned to bucket 3, whereas the load instruction is assigned to bucket 2, and so on.

At step S3, for each bucket, the instructions are ordered into a list such that all dependencies within the list are from an earlier instruction to a later instruction so that later instructions only depend on earlier instructions, as illustrated in FIG. 4C.

At step S7, a pause command is inserted at the end of each list, again as illustrated in FIG. 4C.

At step S8, the lists are joined together, in order, creating a single list of instructions and this is the processed piece of code or snippet.

Accordingly, it can be seen that in embodiments:
  instructions are divided into low-latency and high-latency-type instructions (simple instructions like move, add, xor are low-latency, while more complex instructions like floating-point and memory operations are high-latency);
  a PAUSE command is encoded into the instruction stream along with the two classes of instructions;
  the result of a low-latency instruction is available immediately (and can be taken as input already in the next instruction);
  the result of a high-latency instruction is available after the next PAUSE-command (and may not be taken as input to any instructions until the next PAUSE-command)
  once a thread has been selected for scheduling, instructions are scheduled from that thread until the next PAUSE-command. When the PAUSE-command is encountered, another thread is scheduled; and
  a thread may not be re-scheduled if there are outstanding high-latency instructions.

FIG. 2 shows one possible sequence resulting from these rules (assuming round-robin thread scheduling, and that no thread has to be skipped due to unfinished high-latency instructions).

The compiler generating the program is responsible for analysing dependencies between instructions, re-ordering them, and introducing PAUSE commands in such a way that the above requirements to dependencies between instructions are enforced, while the length between each PAUSE is maximized.

This allows issuing a large number of high-latency operations to run simultaneously, both inter- and intra-thread. The mechanism to check whether a thread can be scheduled is simple (any outstanding high-latency instructions?), which saves power and silicon area.

In one embodiment, instructions in the exact pattern shown in FIG. 2, with round-robin thread scheduling, skipping threads that have outstanding instructions. Instructions are issued in order from each thread, and allowed to complete out of order. The PAUSE command may be encoded as a single bit in the instruction format, that is available in all instructions.

Branch instructions may be implemented as high-latency instructions that fetch instructions into a special instruction-buffer that is separate for each thread.

It will be appreciated that VLIW variants are possible.

One optimization is to encode PAUSE not as a separate instruction, but indicate it with a dedicated bit in the instruction format for every instruction.

Accordingly, in embodiments, a core consists of a register file, thread and instruction schedule logic, instruction fetch and decode logic, a local execution pipeline for low-latency instructions, and a request/response interface for high-latency instructions. There is also a pending completion unit.

In embodiments, the instructions are divided into high-latency and low-latency instructions. Low-latency instructions are executed in the execution pipeline, and have a predictable low execution time. High-latency instructions are sent to an external unit through the high-latency request port, and the response returns some time later in the high-latency response port. In the presence of a data-cache, cache misses (having to load data from a next-level cache) are also considered high-latency operations. The pending completion unit counts how many high-latency instructions are outstanding on the high-latency request/response interface for each thread.

In embodiments, low-latency instructions include: integer addition/subtraction, comparisons, instructions for conditional execution, bitwise boolean operations, whilst high-latency instructions include: load/store operations to shared memory (in absence of data-cache, or in case of miss in the data-cache). These instructions can be either: multiplication, division, floating-point operations, branch, shift.

A possible optimization in embodiments is to enable some high-latency operations to execute as low-latency operations in special cases. For example, if a local data cache is present, load/store instructions complete as low-latency instructions in the case that the operation has a hit in the cache.

In embodiments, the instruction encoding includes a field for opcode, specifying which operation to perform, a destination register index, a first source register index, and depending on the opcode, either a second source register index or an immediate field, and a thread pause bit.

In embodiments, the register indices in the instruction refer to a fixed set of general purpose registers that are specific to the thread. Instructions executing in the pipeline refer to these registers with the register indices in the instruction encoding. This way, each instruction can read or write any register belonging to that thread, but cannot access registers belonging to another thread. The register file contains all the registers for all the threads that are executing on the core.

In embodiments, the execution pipeline reads the source values from the register file, applies the operation, and writes the result back to the register file. In the case that another instruction needs the result before it is written back, special logic either forwards the result up the pipeline if already computed, or stalls the upper part of the pipeline until the result can be forwarded.

The thread schedule logic will keep executing instructions from a single thread until a thread pause bit is encountered. It will then switch to another thread that does not have any outstanding high-latency instructions, in a round-robin fashion Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

The invention claimed is:

1. A data processing apparatus comprising:
a processor core operable to execute sequences of instructions of a plurality of program threads, said processor core having:
a plurality of pipeline stages, one of said pipeline stages being an instruction schedule stage operable, in response to a thread pause instruction within a first program thread, to prevent scheduling of instructions from the first program thread that follow said thread pause instruction and instead to schedule instructions from a second program thread for execution within said plurality of pipeline stages; and
a pending completion unit operable to identify a first executing instruction, from the first program thread, that is classified as being unlikely to be executable in time for its results to be available for use by a subsequent instruction within the first program thread;
wherein the instruction schedule stage is operable to prevent rescheduling of the first program thread when the pending completion unit identifies the first executing instruction in the first program thread, and the first executing instruction precedes the thread pause instruction;
wherein the instruction schedule stage is operable to instruct a handling unit to execute the first executing instruction; and
wherein the handling unit is operable, when it is determined that the first executing instruction will complete, to indicate to the pending completion unit that the first executing instruction will complete execution in advance of the first executing instruction completing execution.

2. The data processing apparatus of claim 1, wherein the instruction schedule stage is operable to permit rescheduling the first program thread when the pending completion unit indicates that the first executing instruction will have its results available in time for use by the subsequent instruction.

3. The data processing apparatus of claim 2, wherein the instruction schedule stage is operable to provide an indication to the pending completion unit when an instruction to be executed is classified as being unlikely to be executable in time for its results to be available for use by a further instruction.

4. The data processing apparatus of claim 1, wherein the instruction schedule stage is operable to instruct the handling unit to execute the first executing instruction by providing an indication of the first executing instruction and any register to be updated following execution by the handling unit.

5. The data processing apparatus of claim 1, wherein the handling unit is operable, when the first executing instruction completes execution, to provide an indication of the first executing instruction and a register to be updated.

6. The data processing apparatus of claim 1, wherein the instruction schedule stage is operable, in response to the thread pause instruction within the first program thread, to prevent scheduling of all instructions within the first program thread which follow said thread pause instruction and instead to schedule instructions from the second program thread for execution when the pending completion unit indicates that any executing instruction within the first program thread which precedes said thread pause instruction is classified as being unlikely to be executable in time for its results to be available for use by a further instruction.

* * * * *